UNITED STATES PATENT OFFICE.

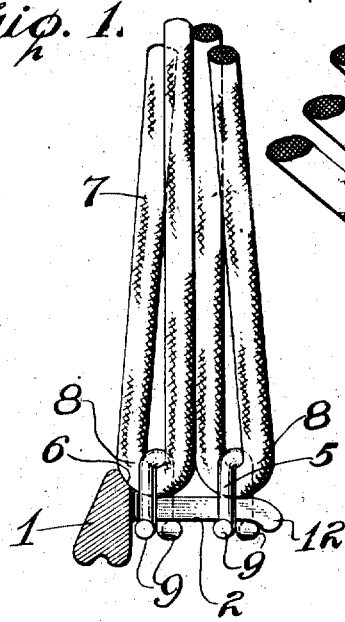
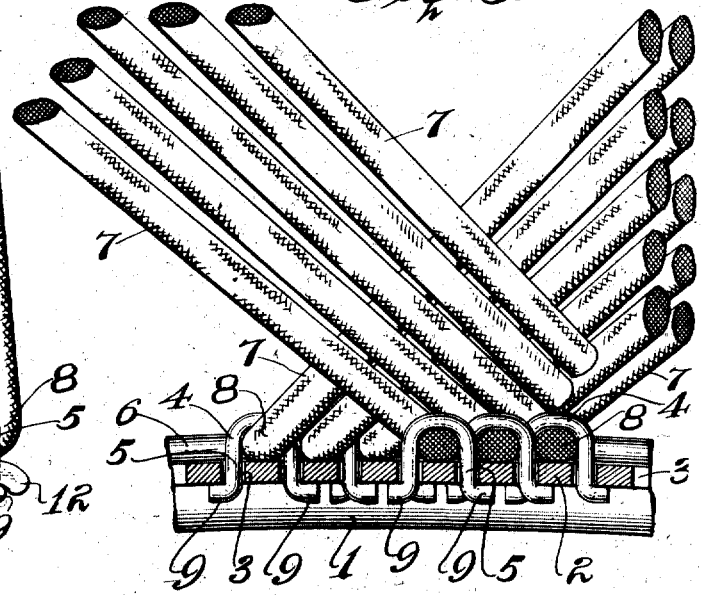
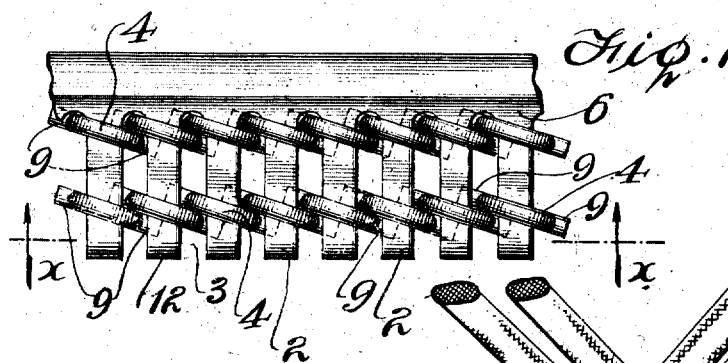
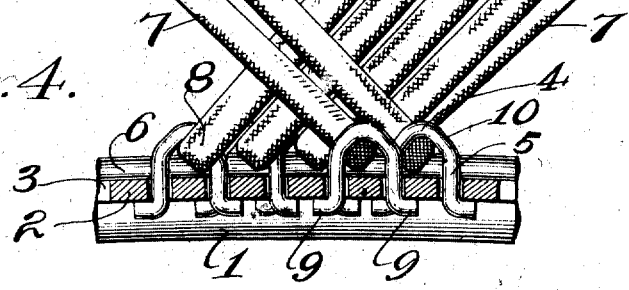

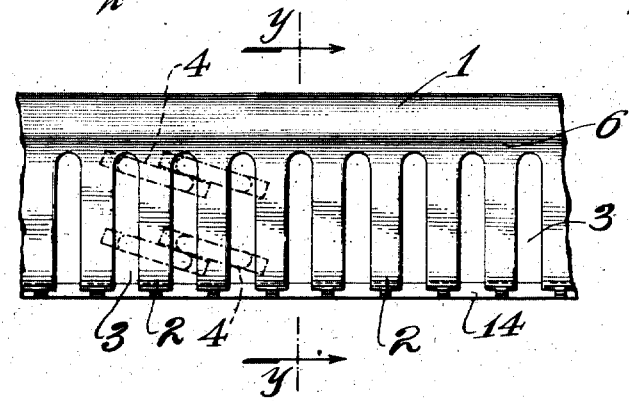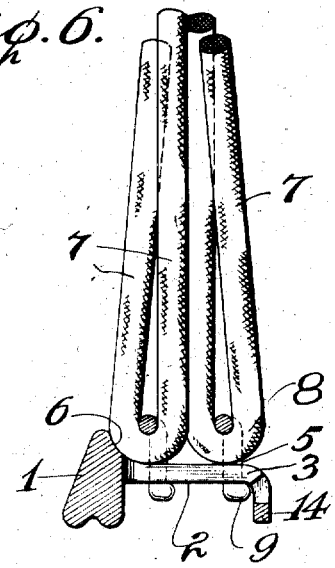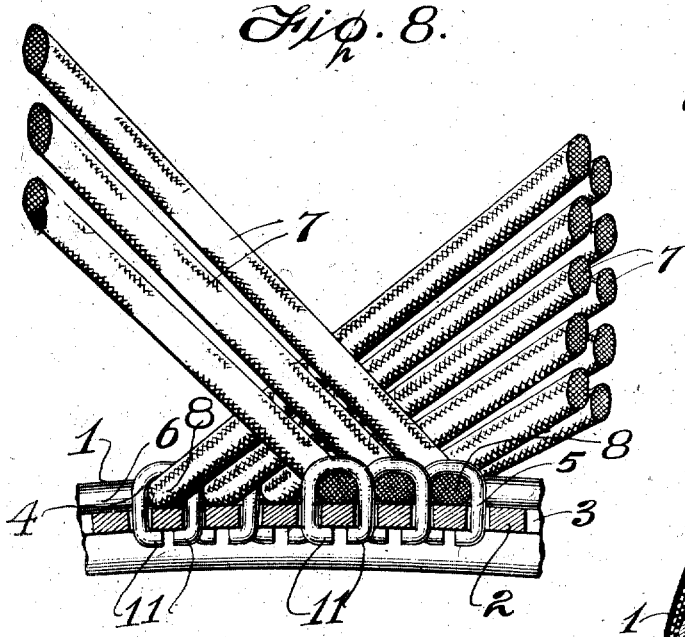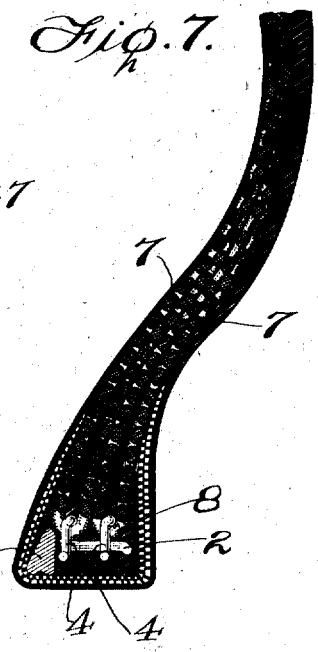

FREDRICK S. DICKINSON, OF NEW YORK, N. Y.

PNEUMATIC TIRE.

1,234,142.  Specification of Letters Patent.  Patented July 24, 1917.

Application filed September 1, 1915. Serial No. 48,399.

*To all whom it may concern:*

Be it known that I, FREDRICK S. DICKINSON, a citizen of the United States, and resident of New York, in the county and State of New York, have invented certain new and useful Improvements in Pneumatic Tires, of which the following is a specification.

This invention relates to pneumatic tires of that class in which the internal body fabric of the shoe or casing is of the "cord" type, and it has particular relation to improved means for anchoring the cord body fabric at the bead or selvage edges thereof.

In the usual construction of cord tires, the length of cord is looped or turned parallel to the annulus of the tire at the bead edge thereof and the portion of the cords extending from said loops are carried over the circumference of the tire at the side and tread portions thereof. and the anchoring of the cords at the bead edge has usually been dependent upon merely the vulcanization by which the cord fabric is amalgamated with the shoe or casing or the turns or loops of the cord parallel to the annulus of the tire at the bead edge have been passed around hooks or staples positioned laterally with relation to the annulus of the tire and embedded in the bead. Such constructions do not maintain the required tension on the cords, owing to the tendency of the latter to assume their natural length, which action ensues by reason of the fact that the first heat of the vulcanizing process softens the rubber compounds sufficiently to permit slippage in the length of the cords. It is therefore desirable that a secure and permanent anchoring means be provided which will effectively and at all times maintain the laid cords at their normal tension.

My invention is particularly adapted for employment in relation to the improved type of cord tire which is shown in my co-pending application Serial No. 10,213, in which the cord body fabric is constituted by a continuous length of cord which is turned or looped at the bead edge at an angle to the annulus of the tire and laid over itself at said turn or loop and spread or diverged therefrom in a gradual and continuous positional relationship in which the under portion of the length of cord gradually emerges from beneath the upper portion and said under and upper portions relatively spread and extend over the space area of the variable circumference of the tire. For an understanding of the general construction of the type of cord tire to which my improved anchoring means are related, reference may be had to the co-pending application above noted.

The object of my invention is to provide a simple and improved anchoring means for the turned or looped length of cord at the bead edge, which will effectively and securely maintain the cords at all times at normal tension, which will enable the laying and looping of the length of cord and its attachment with relation to the anchoring bead ring in a rapid and economical operation, and which will furthermore possess advantages in point of security, inexpensiveness, effectiveness, and general efficiency.

A further object of my invention is to provide an improved anchoring means whereby the selvage or bead edge of the cord body fabric will be securely held against all liability of release of the tension of the cords during the process of making the tire, during vulcanization or curing, or when in operative use thereafter.

A further object of my invention is to provide an improved anchoring means whereby the replacement of broken cords may be effected without the necessity of tearing or cutting through the original bead and the resultant necessity of rebuilding the bead, and which will enable the laying of any replaced cords under the same tension as was maintained in the original cords, and to these ends my improvements comprise detachable or separable means carried by the main bead ring, to which detachable means the cords are directly connected, substantially as hereinafter described.

My invention thus comprises a reinforcing bead ring and inextensible anchoring means inserted upon or attachably connected with the bead ring and securing the selvage-edge loops of the cord.

In the drawings—

Figure 1 is a detail cross-section of the bead ring and anchoring means, showing the cord loops as anchored to one bar or tang of the ring by means of the eyelets.

Fig. 2 is a detail plan view of a section or segment of the periphery of the bead ring and anchoring means, corresponding to the construction shown in Fig. 1, the anchoring eyelets being shown in position but the cords not being illustrated.

Fig. 3 is a longitudinal sectional view, on the plane of the line x—x, Fig. 2, showing the cords in connection with the anchoring eyelets and the placement of the cords of two plies as laid at reverse angles.

Fig. 4 is a section corresponding to the illustration in Fig. 3, illustrating a modified construction of the anchoring eyelets which is adaptable to the employment of cords having a flattened cross-section.

Fig. 5 is a detail plan view of a section or segment of the periphery of the bead ring, illustrating a modified construction in which the lateral bars are formed by T-shaped perforations in a lateral extension thereof.

Fig. 6 is a detail cross-section on the plane of the line y—y, Fig. 5, showing the anchoring eyelets and cord loops in position.

Fig. 7 is a detail cross-section of the bead portion of a completed tire with the anchoring means and cord fabric embedded therein.

Fig. 8 is a section corresponding to Fig. 3 and showing a modified construction of the anchoring eyelets.

Corresponding parts in all the figures are denoted by the same reference characters.

I have herein illustrated my improved anchoring means in its relation to a two-ply cord body fabric, in which the cord lengths of the respective plies are laid at reverse angles and extend obliquely to the transverse or segmental cross-sectional plane of the tire, but it will be understood that the anchoring means is adaptable as well to the employment of a single ply cord fabric or to the employment of any desired plurality of superimposed plies. It will also be understood that in all constructions of the improved anchoring means the bead ring and its bars or tangs and the anchoring eyelets to which the cord loops are connected are all embedded in the bead of the tire and serve the office of a reinforce therefor.

In the practical construction of the cord body fabric, and the anchoring thereof according to my invention, the length of cord is laid over a suitable core or mandrel or former, at an angle thereto, under any desired tension, and turned or looped upon itself at its selvage or bead edges (for instance, in the manner set forth in my copending application above referred to) and with the looped ends resting on the bar or tang or finger of the bead ring herein shown. The anchoring eyelet is then placed over the cord at its loop and over the bar or tang and brought to position to securely anchor the cord at its loop to the bar or tang of the bead ring and thus insure the maintenance of uniform tension in each lay of the cord and throughout its entire length as the cord is laid and the successive eyelets are placed in position. The entire operation of laying and anchoring the cords in the manner just set forth is accomplished by means of a mechanism which constitutes the subject matter of a separate application for patent. It will be understood that, in the laying and anchoring of two or more plies according to my invention as herein set forth, the under ply is first completely laid and anchored, and the next succeeding and overlying ply is correspondingly completely laid and anchored.

Referring to the drawings, 1 designates a metallic bead ring, which is of annular or hoop shape conforming to the annulus of the tire and constitutes the base element of the anchor construction. The bead ring is preferably constructed of steel, rolled or drawn to the desired cross-sectional contour, rolled to the required radius, and then welded at the joint. The ring may, however, be constructed of sheet metal, preferably steel, rolled to impart the desired or suitable cross-sectional contour.

Projecting laterally from the body or main portion of the bead ring are bars or tangs or fingers, as at 2, upon which are mounted the eyelets, as hereinafter described, to which the bead-edge loops of the length of laid cord constituting the cord body fabric are directly connected. The bead ring thus serves as an inextensible anchor base for the looped edges of the cord body fabric which are secured in connection with the ring by the intermediate anchoring eyelets.

In the construction as shown in Figs. 1 and 2, a lateral extension from the body or main portion of the bead ring is slotted in a transverse plane, as at 3, to produce the series of bars or tangs 2, said slots being open at their outer ends. In this construction, the anchoring eyelets are inserted over the outer end of the respective tangs and are brought thereon longitudinally to proper position.

4 designates the anchoring eyelets, which are of metal and may be preferably formed of suitable bent wire. In contour, the eyelet comprises a main portion or eye which straddles or bridges the tang and is of a curvature conforming to the cross-section of the cord, and from said eye or body portion extend securing stems, as at 5, which are received in the slots between the tangs and project under the latter.

From the foregoing, it will be understood that when the length of cord is laid with the looped ends resting upon the tangs, and the eyelets are engaged with the loops and inserted upon the tangs, the relative positions are such that the tangs project laterally with respect to the annulus of the tire, the eyelets are in position approximately parallel to the annulus of the tire, and the bead-edge loops of the length of cord are at an angle to the annulus of the tire and parallel to the tangs. In the preferred contour of the cross-section of the body of the bead ring, its inner face at the top is preferably concaved, as at 6, to conform to the curvature of the cord loop of the inner layer of cord body fabric, as shown in Fig. 1.

In Fig. 2 I have illustrated the relative position of the anchoring eyelets for two layers of cord fabric, the eyelets being arranged in a respective inner and outer series in which each eyelet straddles or bridges a tang and overlaps the edge of the next adjoining eyelet, they being thus set in the close relationship required for the laying of the cord body fabric in the improved manner herein referred to and as set forth in my co-pending application hereinbefore noted. In this position, the anchoring eyelets are at a slightly oblique angle to the longitudinal plane of the tang, but the series of eyelets is parallel to the annulus of the tire and the looped ends of the cord are retained by the eyelets at approximately right angles to the annulus of the tire and substantially in line with the laterally-projecting tangs. The eye or body portion of the eyelet passes through the loop of the cord and securely binds or retains the same between the tang and eyelet-eye, as shown in Fig. 3, the length of cord, 7, passing under and through the eyelet, and lying over itself at the loop, 8, from which it spreads or diverges in a gradual and continuous positional relationship so that the under portion of the length of the cord gradually emerges from beneath the upper portion thereof and said under and upper portions relatively spread and extend over the progressive variable circumference of the tire in the laid position as set forth in my co-pending application above noted. As shown in Fig. 3, the eyelet has a curved eye conforming to the curved cross-section of the cord, and its retaining stems 5—5 are respectively turned outwardly in opposite directions, as at 9, so that they respectively engage under the adjoining tangs at opposite sides of the tang which is straddled or bridged by the eyelet.

In the modification shown in Fig. 4, the eye of the anchoring eyelet is not segmentally curved but is flattened to approximately angular contour, as at 10, to conform to the flattened cross-section of the cord, when cords of flattened contour are employed, said angle being at one side the median plane of the eyelet-eye and thus in line with the oblique or diagonal position in which the cord length is laid with relation to the transverse or segmental cross-sectional plane of the tire.

In the modification shown in Fig. 8, the anchoring eyelets, in lieu of having their stems turned outwardly so that they underlock under the tangs at opposite sides of the tang which is straddled or bridged by the eyelet, have their stems 5 turned inwardly toward each other, as at 11, so that they engage under the tang which is straddled or bridged by the eyelet. Under this construction, the eyelet is substantially ring-shape, either in curved or irregular or angular contour.

It will be noted that in the construction as shown in Fig. 1 the outer edge of the lateral extension of the bead ring 1, which forms the tangs 2, is preferably turned downwardly, as at 12, which not only provides a reinforcing or strengthening edge resistant to strains but also provides a stop against the eyelets when the latter are positioned to retain the tensioned cords.

In Figs. 5 and 6, I have illustrated a modified construction of the bead ring, in which the slots 3 which form the bars 2 are not cut through at an open outer end as in the construction shown in Fig. 2, but said slots, 3, are formed by T-shaped perforations provided in series in the lateral extension from the body or main portion of the bead ring, the head of the T being adjacent the outer edge of said lateral extension. This construction provides a continuous reinforcing flange, as at 14, following the annulus of the bead ring, at the outer ends of the bars, 2, with which the reinforcing eyelets are engaged, said outer ring flange thus bracing the bars in their resistance to strains. The T-shaped construction also thus provides a reinforcing ring which is integral with the bars. To facilitate the insertion of the reinforcing eyelets upon the bars, under the construction just described, the outer reinforcing ring flange 14 is preferably turned downwardly at an angle to the plane of the bars 2, said downward turn commencing at a point just back of the cross-head of the T-slot, as shown in Fig. 6, whereby the cross-head of the T-slot is at an angle to the longitudinal main portion of the slot and forms an opening at the front thereof through which the reinforcing eyelets may be readily inserted and placed over the bar in the same manner as is followed and permitted under the construction with the tangs or bars as shown in Fig. 2. The angular bend or turn of the ring flange 14 also serves to brace the same in its reinforcing office, as will be readily understood.

Under the various constructions as herein shown, it will be noted that the bars or tangs which are formed by the lateral extension from the bead ring are integral with the body or main portion of the latter, which affords maximum conditions of strength in the anchoring of the cords in a connected relation to the bead ring.

In Fig. 7 I have illustrated the bead portion of a completed tire, showing the embedded position of my improved anchoring means and the looped cords at the selvage edge of the cord body fabric after the cords have been laid in the manner hereinbefore set forth and anchored in relation to the bead ring and the anchored structure incorporated in the tire shoe or casing before the vulcanizing process.

The advantages of my invention and the operation of laying the cord fabric and anchoring the loops of the cords at the selvage edge thereof will be readily understood by those skilled in the art to which my improvements appertain. In the improved construction the cords are laced through the anchoring eyelets, with their loops passing through the eyes thereof at an angle to the annulus of the tire and in line with the bars or tangs of the bead ring which are also at an angle to the annulus of the tire, the reinforcing eyelets being intermediate of the bars or tangs and cords and approximately parallel to the annulus of the tire and thus substantially at right angles to the loop at which the cord lays over itself and to the bars or tangs which project laterally from the bead ring.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In anchoring means for the cord body fabric of tires of the "cord" type, a bead ring member in line with the annulus of the tire, bars projecting laterally from the bead ring at an angle to the annulus of the tire, eyelet members connected with said bars and positioned approximately parallel to the annulus of the tire, and the length of cord turned or looped under the eyelets and laid over itself at said loop at an angle to the annulus of the tire.

2. In anchoring means for the cord body fabric of tires of the "cord" type, a bead ring member in line with the annulus of the tire, bars projecting laterally from the bead ring at an angle to the annulus of the tire and having their outer edge turned downwardly, eyelet members connected with said bars and positioned approximately parallel to the annulus of the tire, and the length of cord turned or looped under the eyelets and laid over itself at said loop at an angle to the annulus of the tire.

3. In anchoring means for the cord body fabric of tires of the "cord" type, a bead ring member in line with the annulus of the tire, bars projecting laterally from the bead ring at an angle to the annulus of the tire, eyelet members having a body-eye straddling or bridging over the bars and positioned approximately parallel to the annulus of the tire, and the length of cord turned or looped through the eye of the eyelet and laid over itself at said loop at an angle to the annulus of the tire.

4. In anchoring means for the cord body fabric of tires of the "cord" type, a bead ring member in line with the annulus of the tire, bars projecting laterally from the bead ring at an angle to the annulus of the tire and separated by intervening slots or spaces, eyelet members having a body-eye straddling or bridging over the bars and positioned approximately parallel to the annulus of the tire and having retaining portions passing through said slots or spaces and engaging under the bars, and the length of cord turned or looped through the eye of the eyelet and laid over itself at said loop at an angle to the annulus of the tire.

5. In anchoring means for the cord body fabric of tires of the "cord" type, a bead ring member in line with the annulus of the tire, bars projecting laterally from the bead ring at an angle to the annulus of the tire, eyelet members attachably inserted upon and mounted over said bars and positioned approximately parallel to the annulus of the tire, and the length of cord turned or looped under the eyelets and laid over itself at said loop at an angle to the annulus of the tire.

6. In anchoring means for the cord body fabric of tires of the "cord" type, a bead ring member in line with the annulus of the tire, bars projecting laterally from the bead ring at an angle to the annulus of the tire and separated by intervening approximately T-shaped slots forming a continuous reinforcing flange at the outer ends of the bars, eyelet members connected with said bars and positioned approximately parallel to the annulus of the tire, and the length of cord turned or looped under the eyelets and laid over itself at said loop at an angle to the annulus of the tire.

7. In anchoring means for the cord body fabric of tires of the "cord" type, a bead ring member in line with the annulus of the tire, bars projecting laterally from the bead ring at an angle to the annulus of the tire and separated by intervening approximately T-shaped slots forming a continuous reinforcing flange at the outer ends of the bars, said flange being turned downwardly from a point in rear of the cross-head of the T-slots, whereby said cross-head is at an angle to the longitudinal main portion of the slot and forms an opening at the front thereof, eyelet members attachably inserted upon and mounted over said bars and positioned approximately parallel to the annulus of the tire, and the length of cord turned or looped under the eyelets and laid over itself at said loop at an angle to the annulus of the tire.

8. In anchoring means for the cord body fabric of tires of the "cord" type, a bead ring member in line with the annulus of the tire, bars projecting laterally from the bead ring at an angle to the annulus of the tire and separated by intervening slots or spaces, eyelet members having a body-eye straddling or bridging over the bars and positioned approximately parallel to the annulus of the tire and having stems projecting from said body-eye through said slots or spaces and engaging under the bars at opposite sides of the bar which is bridged by the eyelet, and the length of cord turned or looped through the eye of the eyelet and laid over itself at said loop at an angle to the annulus of the tire.

9. In anchoring means for the cord body fabric of tires of the "cord" type, the combination, with a bead ring member in line with the annulus of the tire and having laterally-projecting bars, of eyelet members engaged and connected with said bars, and the length of cord turned or looped under the eyelets, said eyelet members constituting an intermediate anchorage between the cord loops and the bars of the bead ring member.

10. In anchoring means for the cord body fabric of tires of the "cord" type, the combination, with a bead ring member in line with the annulus of the tire and having laterally-projecting bars separated by intervening slots or spaces, of eyelet members engaged and connected with said bars and having a body-eye straddling or bridging over the bars and retaining portions passing through said slots or spaces and engaging under the bars, and the length of cord turned or looped through the eye of the eyelet, said eyelet members constituting an intermediate anchorage between the cord loops and the bars of the bead ring member.

11. In anchoring means for the cord body fabric of tires of the "cord" type, a bead ring member in line with the annulus of the tire, eyelet members connected with said bead ring member and positioned approximately parallel to the annulus of the tire, and the length of cord turned or looped under the eyelets and laid over itself at said loop at an angle to the annulus of the tire.

12. In anchoring means for the cord body fabric of tires of the "cord" type, a bead ring member in line with the annulus of the tire, eyelet members straddling or bridging a portion of the bead ring member and connected therewith and having their cord-engaging eye positioned approximately parallel to the annulus of the tire, and the length of cord turned or looped through said eye of the eyelet and laid over itself at said loop at an angle to the annulus of the tire.

13. In anchoring means for the cord body fabric of tires of the "cord" type, a bead ring member in line with the annulus of the tire, a series of eyelet members respectively attachably connected with said bead ring member and carried thereby, and the length of cord turned or looped under the eyelets, said eyelet members respectively constituting a detachable intermediate anchorage between the cord loops and the bead ring member.

14. In anchoring means for the cord body fabric of tires of the "cord" type, the combination, with a bead ring member in line with the annulus of the tire, and the length of cord turned or looped at the bead-edge portion and laid over itself at said loop at an angle to the annulus of the tire, of intermediate anchoring means connected with and carried by the bead ring member and having a portion positioned approximately parallel to the annulus of the tire for engagement with the cord loops which are at an angle thereto.

15. In anchoring means for the cord body fabric of tires of the "cord" type, the combination, with a bead ring member in line with the annulus of the tire, and the length of cord turned or looped at the bead-edge portion, of intermediate anchoring means extending between the bead ring member and the cord loops and comprising a plurality of members respectively attachably connected with the bead ring member and engaging the cord loops, said intermediate anchoring means constituting a detachable connection between the respective cord loops and the bead ring member.

16. In anchoring means for the cord body fabric of tires of the "cord" type, the combination, with a bead ring member in line with the annulus of the tire and having bars projecting laterally and turned downwardly at their outer edge, of eyelet members engaged and connected with said bars, and the length of cord turned or looped under the eyelets, said eyelet members constituting an intermediate anchorage between the cord loops and the bars of the bead ring member.

In testimony whereof I have signed the foregoing specifications.

FREDRICK S. DICKINSON.